(Model.)
2 Sheets—Sheet 1.
G. W. PACKER.
DISK HARROW SEEDER.
No. 495,120.
Patented Apr. 11, 1893.
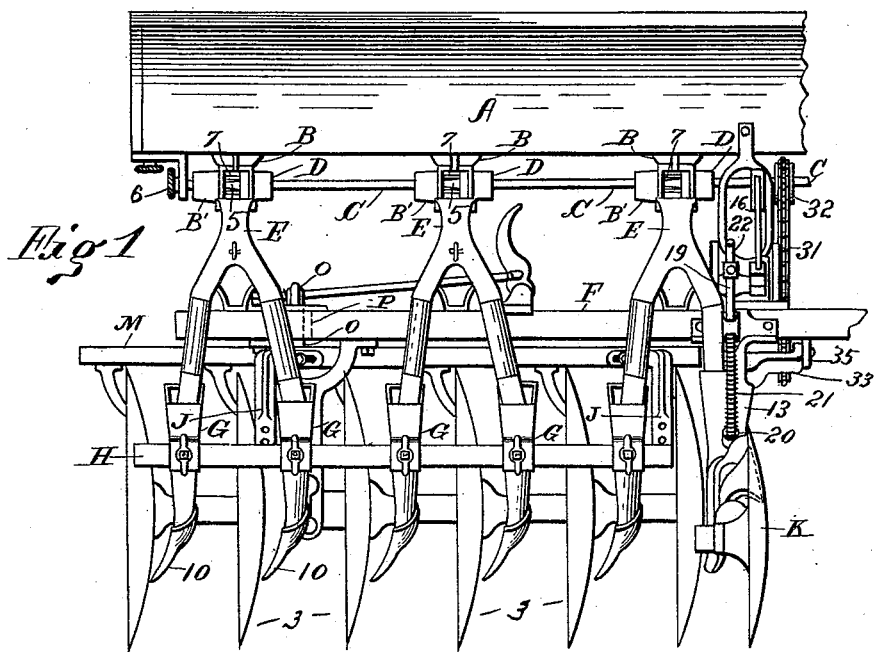
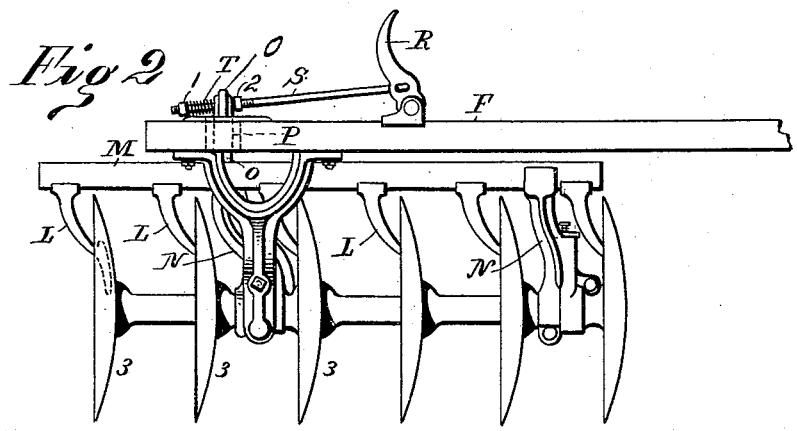
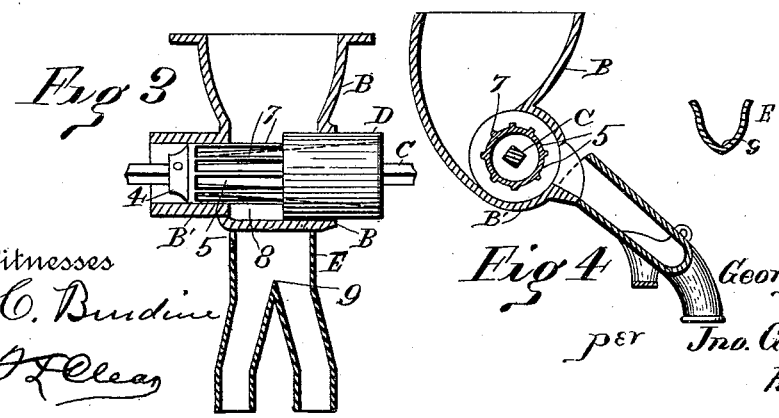
Witnesses
Inventor
George W. Packer
per Jno. G. Manahan.
his Attorney (Model.) 2 Sheets—Sheet 2.
G. W. PACKER.
DISK HARROW SEEDER.
No. 495,120. Patented Apr. 11, 1893.
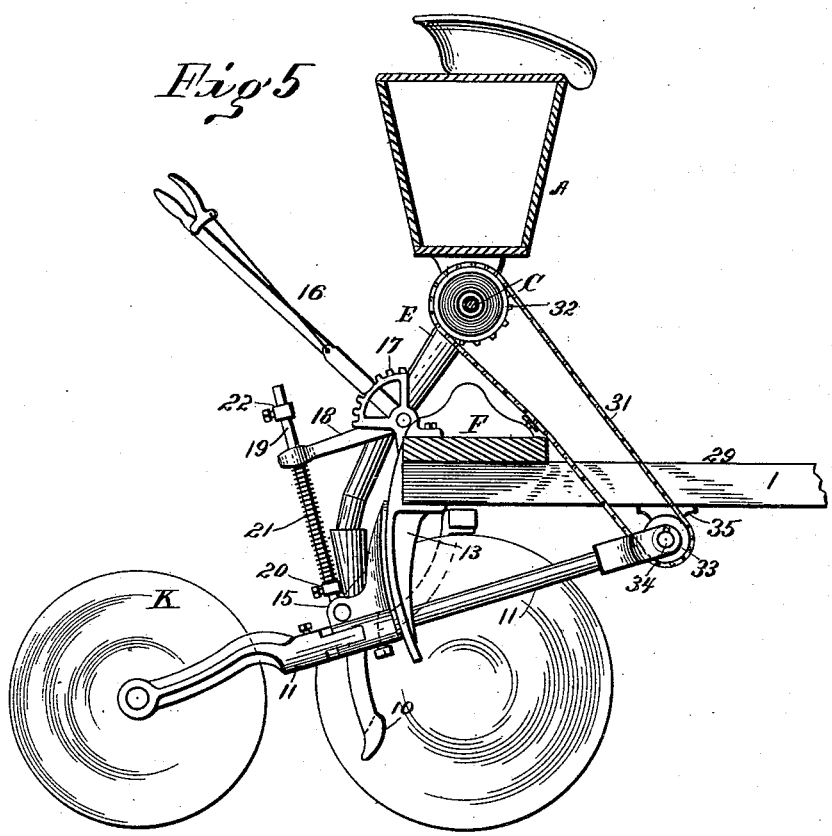
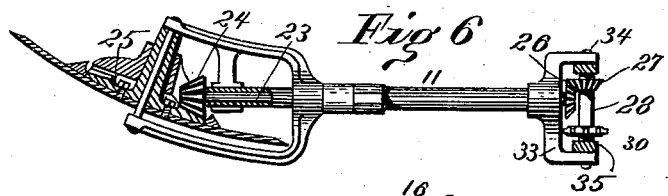
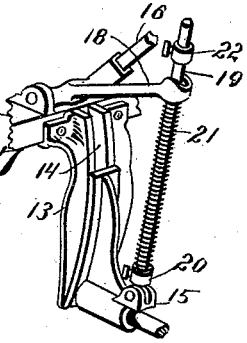
Witnesses
C. C. Burdine
F. L. Clear
Inventor
George W. Packer
per Jno. G. Manahan
Attorney

UNITED STATES PATENT OFFICE.

GEORGE W. PACKER, OF ROCK FALLS, ASSIGNOR TO THE KEYSTONE MANUFACTURING COMPANY, OF STERLING, ILLINOIS.

DISK-HARROW SEEDER.

SPECIFICATION forming part of Letters Patent No. 495,120, dated April 11, 1893.

Application filed July 21, 1892. Serial No. 440,809. (Model.)

*To all whom it may concern:*

Be it known that I, GEORGE W. PACKER, a citizen of the United States, residing at Rock Falls, in the county of Whiteside and State of Illinois, have invented certain new and useful Improvements in Disk-Harrow Seeders; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention has reference to improveprovements in disk harrows and seeders, and refers to an improvement in the seeding devices, in the employment of a central independent disk, and in devices for operating the scraper bar, susceptible of being adjusted to any degree of tension, from one point on each gang of disks.

The object of my improved seed cup or chamber is to first provide a longitudinally adjustable integral seed cylinder, which shall have sufficient flexibility of attachment to its shaft to snugly fit the seed chamber, within which it revolves, regardless of casual variations in the line of the shaft upon which said seed cylinder is seated, and by which it is rotated; and, secondly, to bifurcate the seed ducts leading from said seed cups so as to divide the stream of seed therefrom and discharge it behind two of the disks.

A further improvement in the seed discharges is the provision of a projection on the side of the lower end of the seed boot opposite the disk, a short distance below the lower opening of said boot, and giving said projection a scraper-like formation to protect the exit end of the seed boot against accumulating mud or débris, and also to serve to distribute the seed in the furrow gash.

The purpose of the central independent disk is to cut out the usual untouched strip of earth between the inner ends of the disk gangs, and to furnish means for rotating the seed cylinders and to cover the seed which is deposited in said interval.

The object of my improvements in the scraper bar is to adjust the bearing force of the scrapers, against the face of the disks, with one spiral spring, adapted to operate, from one point, uniformly upon all of the disks in each gang.

I attain these objects by the mechanism illustrated in the accompanying drawings, in which Figure 1 is a rear elevation of a portion of a disk seeder, involving my invention. Fig. 2 is a like partial rear elevation, exhibiting the construction and operation of the adjustable scraper bar. Fig. 3 is a partial sectional detail of the seed cylinder seated in the seed cup leading from the seed hopper, and of the upper end of the bifurcated seed tube or duct E leading therefrom. Fig. 4 is another view of the same, partially in section. Fig. 5 is a vertical longitudinal section in the line of the rear, independent, central disk, showing most of the parts in side elevation. Fig. 6 is a detail of some of the parts driven by said central disk, showing the latter in horizontal cross-section. Fig. 7 is a detail view, from the rear, of the vertical way, at rear of draft plank, to permit vertical movement of said central disk.

Similar letters and figures refer to similar parts throughout the several views.

Referring to Fig. 1, A is the usual seed box, suitably supported upon the frame of the machine. B, B are the several seed cups leading therefrom. C is the rotating seed shaft or axle carrying seed cylinders D, D. E, E are the seed ducts or chutes suitably supported upon the transverse draft plank F, leading from the seed cups aforesaid, and connected flexibly with forwardly projecting seed boots G, G seated upon a transverse bar H, attached to brackets J, J suitably connected, respectively, to the hangers of the disk gangs. K is the central independent disk before referred to, placed slightly back of the interval between the disk gangs, and so located as so operate upon the strip of earth between the inner ends of the disk gangs.

Referring to Fig. 2, L, L are the disk scrapers rigidly seated upon the scraper bar M, suitably supported in ways of the brackets N, from the axle of the disk gangs, in condition to be oscillated laterally. O is a short vertical post seated on the scraper bar M, and projecting upward through a vertical slot P formed longitudinally in the draft plank F. R is a short lever suitably fulcrumed on the upper surface of the draft plank F, a suitable distance toward the center of said plank from the slot P, and connected to the post O by means of a short horizontal rod S pivotally attached at one end to the lever R, a short distance above its hinged or fulcrumed lower end, and projected outwardly through a suitable eye formed in the upper end of the post O, and provided at its outer end, beyond said post, with a suitable thread and nut 1. T is a coiled spring seated on the rod S between the end nut 1 and the post O. A set-nut 2 is seated on the rod S at the opposite face of the post O. The lever R, when thrown outward, by the pressure of the spring T against the post O, throws the scrapers L from the disks 3, and when said lever R is thrown toward the center of the draft plank F, it draws, through the medium of the rod S and nut 1 and spring T, the scrapers L against the concave faces of the disks 3. The lever R when at the limits, respectively, of its in and out throw, rests upon the draft plank F. The point of attachment of the rod S to said lever being below the fulcrumed end of the latter at each limit of its lateral movement, the weight of said lever serves to hold the scrapers in the respective positions above mentioned after passing the fulcrum point. By moving the nut 1, the tension of the spring T can be regulated as desired, and the scrapers L thereby held with any desired degree of force against the disks 3. The advantage of this part of my invention consists in the fact that the adjustment of one spring T regulates the force of contact with the several disks, of all of the scrapers L belonging to that gang, instead of requiring, as heretofore, a separate adjustment to each disk.

Referring to Figs. 3 and 4, the lower portions of the seed cups B extend laterally into a sleeve B', within which the seed cylinder D, seated on the axle or shaft C, rotates. The longitudinal opening through the center of the seed cylinder D is much larger than the axle C, except at the outer end 4 of said seed cylinder, where the latter is loosely fitted upon and attached to the axle C, which permits the seed cylinder D to maintain its proper relation with the sleeve B', notwithstanding any casual variations of said axle C from the true line. In a portion of the periphery of the seed cylinder D are formed the recesses 5, and at the bottom of said recess the seed cylinder D is of a conical formation, tapering toward its attached end. The fluted and smooth portions of the cylinder are integral. When the seed cylinder is adjusted through the cup, into the sleeve or extension (of the cup), the smooth portion moving therewith, acts in the capacity of a cut-off, and closes a part, if not all, of the exit in the cup, depending upon the adjustment of the cylinder. At the end of the axle C (see Fig. 1), there is suitably seated a thumb-screw 6, adapted to move and adjust said axle longitudinally, by means of which all of the seed cylinders D are moved laterally either way within the sleeves B', and the conical formation, aforesaid, of the recess 5 is for the purpose of gaging the quantity of seed discharged from each cup B, both by narrowing the area of said recess registering with the cup B, and also by changing the depth of the bottom of said recess, presented to said cup in the various adjustments of the cylinders D. The longitudinal ribs 7, between the recesses 5 engage and carry the seed from the cup B. The advantage of the graduated depth of the spaces between ribs 7, is, that in sowing small seeds the capacity of said spaces can be sufficiently lessened, without making the operating portions of recess 5, so narrow as to interfere with the passage of the seed through the same, or grind the seed between the inner end of the larger portions of cylinder D, and the opposite wall of cup B.

The seed is discharged from the recess 5, through an opening 8 in the bottom of the cup B, into the seed duct E. The latter lies in a diagonal position, and at its upper end has a trough-like formation on its lower side, by reason of which the seed is collected into the center of the lower side of said duct, and as it passes, by its own gravity, down the latter, it is divided by the projection, 9 at the bifurcation of said seed duct E, and thereafter passes in two equal streams down said bifurcations, respectively, and is discharged therefrom into the seed boots G, and from thence into the furrow gash made by the adjacent disk 3 at the convex side of the latter, in a situation to be covered by the earth thrown over from the concave side of the next disk 3. The inner side of the lower end of the seed boot G is projected below and across the line of the seed exit thereof, and given a scraper-like formation 10. The latter has the double function of protecting the lower end of the seed boot G against the accumulation of mud or other matter, which might obstruct the seed, and also serves as a deflector or distributer of the seed.

The advantage of the construction just described, consists in the fact that one seed cylinder D can be utilized to furnish the seed for two disks, and discharges the same in the furrow opening of each disk, just previous to the filling up of said furrow by the adjacent disk, the lower end of the seed boot G being projected sufficient forward for that purpose. Also each seed cylinder is made of one piece and all can be adjusted simultaneously.

The independent central disk K is journaled to the rear portion of the tube 11, which is projected forwardly between the inner ends of the disk gangs, and suitably pivoted in a vertical plane to the frame of the machine at 34 (see Fig. 5). A metallic guide 13 is attached to the rear end of the draft plank F, and provided in its rear side with the vertical slot 14. A bracket 15 is rigidly seated on the tube 11 in a vertical position, to traverse the slot 14 in the guide 13. A hand lever 16, provided with the usual spring pawl, is suitably journaled on the draft plank F, in position to be optionally engaged with the quadrant 17, also seated on said plank. From the lower end of the lever 16 and integral therewith, there is projected backward an arm 18, which at its rear end is sleeved on a vertical rod 19 seated on the tube 11. On the rod 19, near its lower end, is a collar 20, adjustable by means of a set-screw seated in the walls thereof; and between the collar 20 and the rear of the arm 18, a coiled spring 21 is seated on the rod 19. Near the upper end of the latter rod there is a second collar 22, also adjustable by means of a set-screw. When the lever 16 is thrown back, as shown in Fig. 5, the arm 18, through the medium of the spring 21, holds the tube 11 down in the working position of the disk K, and the elasticity of the spring 21 permits the vertical oscillation of the tube 11, to enable the disk K to accommodate itself to the inequalities of the ground. The spring 21 may be made more or less stiff by moving the said collar 20. The purpose of the collar 22 is to form an engaging point for the rear end of the arm 18, when the lever 16 is thrown forward to raise the disk K from the earth, in transportation, or to suspend seeding, or in turning around and by shifting collar 22 any degree of altitude of the disk K can be obtained.

Through the interior of tube 11 is suitably seated longitudinally a rod 23, upon the rear end of which is rigidly seated a beveled pinion 24, adapted to engage with another beveled pinion 25, seated in the concave face of disk K, whereby the rotation of the latter imparts a rotary movement to the shaft 23. On the front end of the shaft, 23 and where it projects beyond the tube 11, there is rigidly seated a beveled pinion 26, adapted to engage and actuate a similar pinion 27, rigidly seated on the short, transverse, rotating sleeve 28, carried on a fixed shaft 34, supported in a bracket 35 from the under side of the tongue 29. A sprocket wheel 30 is also seated on sleeve 28, and from thence the sprocket chain 31 extends to the sprocket wheel 32 seated on the axle C, and by means of the intermediate mechanism just described, and shown in Figs. 5 and 6, the rotation of the disk K is communicated to the axle C, and its adjunctive seed cylinders D. The pivotal forward connection of the disk K is accomplished by seating the forward end of the tube 11 in the bracket 33, which is pivotally seated, at its extremities, on the ends of the shaft 34, as shown in Fig. 6.

By the use of the independent disk K, it is made practicable to discharge and cover seed at the inner end of one of the disk gangs, thereby making the distribution of seed uniform across the machine. The suspension of the rotation of the axle C, and thereby the intermission of the seeding, is accomplished by simply raising the disk K, through the medium of the lever 16, from contact with the earth.

By the before described mechanism, the seed is drilled in parallel rows. If it is desired to sow broadcast, the seed ducts E can be removed, and the seed carried from the cylinders D to the front of the disks K, by obvious forms of seed ducts communicating therewith, and projected diagonally forward and downward.

What I claim as my invention, and desire to secure by Letters Patent of the United States, is—

1. The combination of the seed cup B, sleeve B', rotating axle C, seed cylinder D, loosely sleeved on said axle, and attached, at one end, thereto, and seated within sleeve B', said seed cylinder D, being provided, intermediate its ends, with the recesses 5, having a bottom tapering toward its said attached end, and with ribs 7, substantially as shown and for the purpose described.

2. The combination of the scraper bar M provided with vertical post O, transverse plank F provided with slot P, and lever R seated on said plank, rod S pivotally attached to said lever, as shown and projected through the upper end of said post, and provided with nuts 1 and 2 and the spring T; seated on the rod S between the end nut 1 and the post O substantially as shown, and for the purpose described.

3. The combination of the central disk K pivotally attached to the frame of the disk harrow by means of tube 11, vertical guide 13 provided with slot 14, bracket 20 seated on the tube 11, and projected within and adapted to traverse said slot 14; substantially as shown, and for the purpose described.

4. The combination of the disk K pivotally attached to the frame of the machine by the tube 11, guide 13 projected below said frame, bracket 15 seated on said tube, vertical rod 19 provided with movable collars 20 and 22 seated on said tube, lock lever 16 provided with arm 18 sleeved upon rod 19, between said collars, and the spring 21 seated on said rod between collar 20 and arm 18; substantially as shown, and for the purpose described.

5. The combination of the disk K provided with beveled pinion 25, hollow tube 11, shaft 23 seated in said tube, and provided at its respective extremities with pinions 24 and 26, sleeve 28 provided with pinion 27, sprocket wheel 30 seated on sleeve 28, axle C provided with sprocket wheel 32 and chain 31; substantially as shown, and for the purpose described.

In testimony whereof I affix my signature in presence of two witnesses.

GEORGE W. PACKER.

Witnesses:
JOHN G. MANAHAN,
THOMAS A. GALT.